(12) United States Patent
Läubli

(10) Patent No.: US 9,759,357 B2
(45) Date of Patent: Sep. 12, 2017

(54) METHOD FOR PRODUCING TUBULAR BODIES FOR PACKAGING TUBES, AND A PACKAGING TUBE

(75) Inventor: Julius Läubli, Rapperswil (CH)

(73) Assignee: PACKSYS GLOBAL (SWITZERLAND) LTD., Rëti (CH)

( * ) Notice: Subject to any disclaimer, the term of this patent is extended or adjusted under 35 U.S.C. 154(b) by 877 days.

(21) Appl. No.: 14/126,456

(22) PCT Filed: Jun. 5, 2012

(86) PCT No.: PCT/EP2012/060571
§ 371 (c)(1),
(2), (4) Date: May 21, 2014

(87) PCT Pub. No.: WO2012/171828
PCT Pub. Date: Dec. 20, 2012

(65) Prior Publication Data
US 2014/0255637 A1   Sep. 11, 2014

(30) Foreign Application Priority Data

Jun. 16, 2011   (DE) .................. 10 2011 051 110

(51) Int. Cl.
*B29C 53/38* (2006.01)
*B29C 65/02* (2006.01)
(Continued)

(52) U.S. Cl.
CPC ............ *F16L 11/042* (2013.01); *B29C 53/38* (2013.01); *B29C 53/54* (2013.01); *B29C 65/02* (2013.01);
(Continued)

(58) Field of Classification Search
CPC ......... B29C 53/38; B29C 53/50; B29C 53/54; B29C 65/02; B29C 65/04; B29C 65/3656;
(Continued)

(56) References Cited

U.S. PATENT DOCUMENTS 3,004,694 A * 10/1961 Karl .......................... B31C 1/00
                                                            138/141
5,569,144 A * 10/1996 Schwyn .................. B29C 53/50
                                                              413/72
(Continued)

FOREIGN PATENT DOCUMENTS

CN       1234328        11/1999
GB       2 156 268       3/1985
(Continued)

OTHER PUBLICATIONS

Japanese Office action dated Jan. 18, 2016 for Application No. 2014-515133.
(Continued)

*Primary Examiner* — Michael Tolin
(74) *Attorney, Agent, or Firm* — Bachman & LaPointe, PC

(57) ABSTRACT

A method for manufacturing tubular bodies (1) exhibiting an inner circumferential surface (8) and outer circumferential surface (7) for packaging tubes out of a strip-shaped film substrate (2), which exhibits at least one weldable plastic layer (3) or consists of the latter, and which encompasses a first edge face (5) extending in the longitudinal direction of the film substrate (2) or a second edge face (6) spaced apart from the first edge face (5) by the width of the film substrate (2), wherein the first edge face (5) runs at a first angle ($\alpha$) relative to a first thickness extension direction on a first radially innermost border (9) of the first edge face (5), and the second edge face (6) runs at a second angle ($\beta$) relative to a second thickness extension direction on a second radially outermost border of the second edge face (6), and wherein the first and second edge faces (6) are placed opposite each other and joined together during exposure to heat, wherein the first angle ($\alpha$) and second angle ($\beta$) differ in size, in that the selected first angle ($\alpha$) is smaller than the
(Continued)

second angle (β) by an angular difference of between 3° and 70°, and that the edge faces (5, 6) are situated in such a way that an outwardly open longitudinal gap (11) is delimited by the first and second edge faces (5, 6).

14 Claims, 4 Drawing Sheets

(51) Int. Cl.
| | |
|---|---|
| *B29D 23/20* | (2006.01) |
| *B32B 1/08* | (2006.01) |
| *B65D 35/10* | (2006.01) |
| *F16L 11/04* | (2006.01) |
| *B29C 65/00* | (2006.01) |
| *B29C 53/54* | (2006.01) |
| *B29C 65/04* | (2006.01) |
| *B29L 23/20* | (2006.01) |
| *B29L 9/00* | (2006.01) |

(52) U.S. Cl.
CPC .......... *B29C 65/04* (2013.01); *B29C 66/1122* (2013.01); *B29C 66/1142* (2013.01); *B29C 66/1162* (2013.01); *B29C 66/4322* (2013.01); *B29C 66/723* (2013.01); *B29D 23/20* (2013.01); *B32B 1/08* (2013.01); *B65D 35/10* (2013.01); *B29C 66/322* (2013.01); *B29C 66/71* (2013.01); *B29C 66/7234* (2013.01); *B29C 66/72321* (2013.01); *B29L 2009/003* (2013.01); *B29L 2023/20* (2013.01); *F16L 2011/047* (2013.01); *Y10T 428/139* (2015.01); *Y10T 428/1379* (2015.01)

(58) Field of Classification Search
CPC ............ B29C 65/3676; B29C 65/7832; B29C 66/1122; B29C 66/1142; B29C 66/1162; B29C 66/322; B29C 66/4322; B29C 66/49; B29C 66/71; B29C 66/723; B29C 66/72321; B29C 66/7234; B29C 66/83423; B29D 23/20; B29K 2023/06; B29K 2023/12; B29L 2009/003; B29L 2023/20; B32B 1/08; B65D 35/10; F16L 11/042; F16L 2011/047
See application file for complete search history.

(56) References Cited

U.S. PATENT DOCUMENTS

| | | | |
|---|---|---|---|
| 6,161,366 A | 12/2000 | Bausch et al. | |
| 9,574,686 B2 * | 2/2017 | Banerjee | ............... F16L 9/12 |
| 2010/0243094 A1 * | 9/2010 | Arz | ................. B32B 1/08 |
| | | | 138/103 |

FOREIGN PATENT DOCUMENTS

| | | | | |
|---|---|---|---|---|
| JP | 51127691 U | | | 10/1976 |
| JP | 55-159961 A | * | | 12/1980 |
| JP | 5781912 U | | | 5/1982 |
| JP | 04131225 A | | | 5/1992 |
| JP | 08-001838 A | * | | 1/1996 |
| JP | 08-324600 A | * | | 12/1996 |
| JP | 2001206393 A | | | 7/2001 |
| JP | 3569068 B2 | | | 9/2004 |
| WO | WO 2006/079538 A1 | * | | 8/2006 |

OTHER PUBLICATIONS

Japanese Office action dated Aug. 10, 2016 for Application No. 2014-515133.
International search report dated Sep. 26, 2012.
Chinese Office action for Apln No. 201280039483.5 dated May 5, 2015.

* cited by examiner

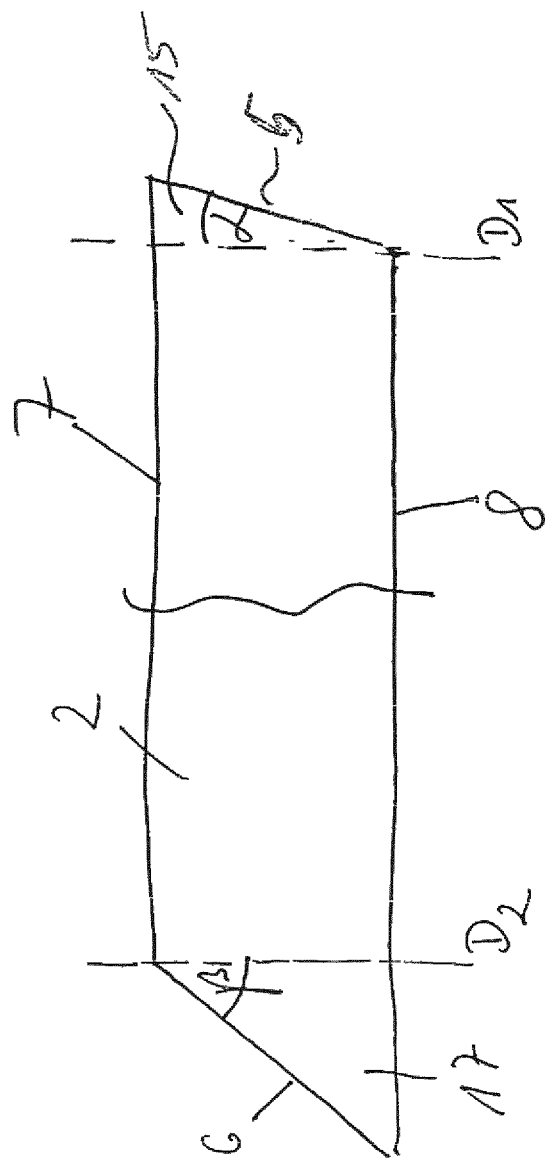

METHOD FOR PRODUCING TUBULAR BODIES FOR PACKAGING TUBES, AND A PACKAGING TUBE

The invention relates to a method for manufacturing tubular bodies exhibiting an inner circumferential surface and outer circumferential surface for packaging tubes out of a strip-shaped film substrate, as well as to a packaging tube encompassing a tubular body preferably manufactured using a method according to the invention, along with a tubular head fixedly joined with the tubular body.

Known from WO 2007/113781 is a tubular body for packaging tubes. The tubular body of the known packaging tube is manufactured by having two edge faces oriented at a right angle relative to the outer circumferential surface abut flush against each other, and then providing the outer circumferential surface with a sealing tape that is separate from the film substrate forming the tubular body, and used to fix (weld) the film substrate to the aforementioned tube shape. The disadvantage to the known packaging tube is that an additional material in the form of a sealing tape must be used for welding the film substrate or manufacturing the tubular body, which also appears visually bulky. As an alternative to arranging the sealing tape on the outer circumferential surface, the aforementioned publication describes providing the sealing tape on the interior side, with the danger of cracking in the actual film substrate. In addition, manufacture is comparatively complicated and material-intensive because a separate sealing tape is used.

Known from CH 686 665 A5 is a method for manufacturing a tubular body for a packaging tube, in which non-beveled edge faces of the film substrate are placed against each other, after which the film substrate is welded together. As opposed to the aforementioned prior art, the described method does without separate sealing tape. The disadvantage to the known packaging tube is the comparatively small contact surface of the two edge faces, and the fact that welding only takes place in a radially inner area and an outer area radially spaced apart from the latter.

Known from DE 41 21 427 C2 is an alternative method for manufacturing a tubular body. Shown therein on FIG. 8 is an exemplary embodiment, in which the opposing, longitudinally extending edge faces of a strip-shaped film substrate to not run at a right angle to the outer circumferential surface, but rather have a beveled design, wherein the edge faces are placed against each other in such a way that the edge faces line up precisely radially outward, i.e., two adjacent outer circumferential surface sections seamlessly converge in the circumferential direction or lie on the same radius prior to welding. In this state, the edge faces are then welded together by being sandwiched between two sealing strips. Tubular bodies manufactured in this way have proven themselves. One positive aspect to be emphasized in particular is that the known method makes do without additional sealing tape. The contact surfaces are also comparatively large. However, efforts are underway to further improve the bond, in particular the welded seam between the edge faces, especially in terms of robustness and with respect to an even lower permeability to moisture and/or oxygen. Defective welds of the end faces are preferably to be avoided, so as to thereby reliably prevent a packaging tube from undesirably bursting or spontaneously opening in the area of the welded seam.

Known from JP 08 001 838 A is a tube in which the first and second edge faces run at the same angle with respect to a respective thickness extension direction of the film substrate at a radially innermost or radially outermost border. Such an embodiment is also shown in JP 08 091 397 A.

SUMMARY OF THE INVENTION

Proceeding from the aforementioned prior art, the object of the invention is to indicate an improved method for manufacturing tubular bodies for packaging tubes, which does without additional sealing tape, and also ensures a better (more robust and reliable) bond between the edge faces of the tubular body. The object is further to indicate a correspondingly improved, in particular more robust packaging tube.

This object is achieved with the features disclosed herein in terms of the method, and in terms of the packaging tube. Advantageous further developments of the invention are also indicated. All combinations of at least two features disclosed in the specification, claims and/or figures fall within the framework of the invention.

To avoid repetition, features disclosed for the device are also to be regarded as disclosed for the method and claimable. Likewise, features disclosed for the method are to be regarded as disclosed for the device and claimable.

The invention is based on the idea not of placing the edge faces of the film substrate running at an angle relative to the outer circumferential surface against each other over their entire surface and then welding them, but rather of having the selected first less than 90° angle at which the first edge face runs relative to the first thickness extension direction of the film substrate be smaller than the second less than 90° angle at which the opposing second edge face runs relative to the second thickness extension direction of the film substrate, and also of arranging the edge faces running at an angle relative to the thickness extension directions of the film substrate in such a way that the edge faces delimit an outwardly open (outer) longitudinal gap with preferably an essentially triangular contour viewed in section, which preferably is filled with plastic material during the welding process, which even more preferably does not originate from a sealing tape separate from the film substrate, but from the film substrate itself. Expressed differently, the invention encompasses two core aspects, specifically firstly the selection of different angles between the edge faces and respective thickness extension direction of the film substrate at defined circumferential positions, wherein the first angle is to be roughly 3° to roughly 70° smaller than the second angle, and secondly an arrangement of edge faces relative to each other in such a way that an outwardly open longitudinal gap is delimited between them. The cross section of this outer longitudinal gap outwardly increases in a radial direction from a contact area between the edge faces that is preferably approximately linear in the direction of the longitudinal extension of the film substrate (and has an essentially point or small-surface cross section). For the first time, the proposed measures ensure that the plastic layer material melted into a tube shape while welding the film substrate can fill an area between the edge faces, at least approximately completely, thereby avoiding the materially flush bond between the edge faces in comparison to prior art. Unwelded areas inside of the tubular body wall of the kind encountered in prior art are reduced to a minimum, and preferably avoided completely by the method according to the invention. As already indicated, the edge faces preferably extending along a straight line at a respective angle from the outer circumferential surface up to the inner circumferential surface are placed against each other not over their entire surface, but rather in a comparatively small contact area, or alternatively even spaced somewhat apart from each other, whereupon the positioning step is followed by a welding of the film substrate during exposure to heat while manufacturing the tubular body, for example in that the welding area in which the film substrate is to be welded with itself is sandwiched between two sealing strips that move along with the film substrate, and exposed to heat energy, for example via high-frequency irradiation. In this welding process, the initially outwardly open longitudinal gap is at least partially, and preferably completely, filled with plastic material, which yields a good bond between the edge faces, preferably over their entire surface, since liquid plastic layer material can initially penetrate further inward from the outside in a radial direction than is possible in prior art. At the same time, the melted and then solidified plastic material forms a soft, non-angular, preferably continuous transition between the film substrate edges in a circumferential direction, so that the actual connecting site is hardly visible, and the aesthetic appearance of the subsequent packaging tube is not significantly diminished.

According to the definition in the claims, the first thickness extension direction is located on a circumferential position of the tubular body where the first radially innermost border of the edge face is arranged, i.e., on a circumferential position in which the first edge face hits the inner circumferential surface, more precisely an inner circumferential surface edge section. Therefore, the first angle involves the angle generated by the first edge face and the thickness extension direction (thickness extension direction) extending perpendicular to a tangent on the outer circumferential surface and a tangent on the inner circumferential parallel thereto. The second thickness extension direction is spaced not far apart from the first thickness extension direction in the circumferential direction, and situated on the circumferential position of the tubular body where the second radially outermost border of the second edge face is located, i.e., on the circumferential position where the second edge face hits the outer circumferential surface. The second angle is generated between this second thickness extension direction and the second edge face. In a first approximation, it can preferably be assumed that the first thickness extension direction and second thickness extension direction run parallel to each other not just with the film substrate unspooled, but also given a film substrate molded into a tubular body, since the film substrate thickness along with the distance between the first thickness extension direction and second thickness extension direction are negligibly small by comparison to the radius or diameter of the tubular body. The thickness extension (film thickness) selected for the film substrate preferably ranges between 150 µm and 400 µm. The first thickness extension direction and second thickness extension direction are preferably spaced apart from each other in the circumferential direction by a distance ranging between 0.01 mm and 1.50 mm, preferably between 0.05 mm and 1.00 mm. The diameter selected for the tubular body preferably ranges between 10 mm and 70 mm, particularly between 12.7 mm and 60 mm.

Providing the outer longitudinal gap to be filled later with plastic material makes it possible to process not just film substrates symmetrically structured in relation to a central thickness plane of the film substrate, but also asymmetrically structured, in particular multi-layer film substrates into a tubular body for packaging tubes, without the additional use of sealing tape.

The method according to the invention is suitable for welding a film substrate into a tube shape that exhibits or consists of at least one weldable plastic layer. For example, this can be a thermoplastic plastic, in particular polyethylene, polypropylene or a copolymer of the aforementioned compounds. The at least one weldable plastic layer is preferably paired with at least one barrier layer against the passage of moisture and/or gas, for example an aluminum film or aluminum layer, e.g., evaporation.

The strip-shaped film substrate is preferably molded into the tubular body or tube shape in a known manner, for example using at least one molding strip driven by concavely configured rollers, for example as described in CH 686 665 A5. The fabricated tube is preferably cut to length for obtaining the tubular body after the weld seam has hardened. The edge faces of the film substrate can be cut at the various angles either inline prior to molding into a tube shape by means of correspondingly angled blades situated on the edge face, or in a preceding cutting step.

As a whole, the method according to the invention yields a significantly more robust packaging tube, which is tighter in terms of permeability to moisture and/or gas, since unwelded contact areas between the edge faces are reduced to a minimum, and preferably avoided entirely.

It has proven especially beneficial for the first angle selected to range between 1° and 77°, preferably between 5° and 70°, even more preferably between 10° and 60° and/or the second angle selected to range between 4° and 80°, preferably between 5° and 70°, even more preferably between 10° and 60°.

The angular difference (corresponds to the opening angle of the longitudinal gap formed by the edge faces) between the first and second angle ideally measures between 3° and 30°, even more preferably between 3° and 7°. The first angle is here preferably smaller than the second angle by the aforementioned angular distance.

As mentioned at the outset, it is preferred for manufacturing a reliable or robust welded joint that the outer longitudinal gap between the two sides be at least partially filled with plastic material of the plastic layer. Preferably exclusively with plastic material of the film substrate, i.e., without additional plastic material, for example that would originate from a separate sealing tape.

It especially makes sense for the edge faces that run at varying angles relative to the respective thickness extension direction and preferably exhibit a straight contour in a sectional view be vertically displaced in a radial direction, i.e., for the thickness centers of opposing edge faces measured in the thickness extension direction to be spaced apart in a radial direction, so that the first radially innermost (longitudinal) border of the first edge face lies further to the outside in a radial direction than a second innermost (longitudinal) border of the second edge face (wherein an embodiment can also be realized in which the two edge faces abut against each other with their aforementioned innermost longitudinal borders, i.e., the two innermost longitudinal borders are arranged on the same radius, so as to thereby maximize the longitudinal gap in terms of cross sectional area).

In an embodiment with thickness center displacement, it is preferred for the second edge face with a radially inner tip to project (to a certain extent) over the inner circumferential surface of the film substrate in a circumferential direction, preferably by a distance measured in the circumferential direction ranging between 0.01 mm and 1.50 mm, preferably between 0.05 mm and 1.00 mm. An inner longitudinal gap, i.e., an elongated groove or receptacle, which can be filled with plastic material of the film substrate during the welding process, is here formed between the radial inner section, in particular the tip of the film substrate, projecting over the inner circumferential surface of the film substrate and the inner circumferential surface, more precisely between a radially inner section (distance) of the second edge face and the inner circumferential surface. Therefore, a further development of the invention advantageously provides that an arrangement of beveled edge faces that is vertically displaced as viewed in the radial direction is used to form a type of radially inwardly projecting tip, which is located radially inside the inner circumferential surface of the tubular body, thereby resulting in the aforementioned inner longitudinal gap. In the welding step that follows the positioning step, this inner longitudinal gap is filled with plastic material, in particular of the aforementioned tip, yielding a soft, i.e., non-angular or continuous transition on the inner circumference that ensures a reliable bond between the film substrate and tubular body. The provision of two longitudinal gaps, specifically the outer longitudinal gap essential to the invention and the preferably furnished inner longitudinal gap, results in an especially moisture and gas tight bond of the film substrate with itself, accompanied by the fixation or durable formation of the tubular body.

The invention also presents a packaging tube encompassing a tubular body preferably manufactured with a method designed according to the inventive concept, on which a tube head is fixed in place in a known manner.

The packaging tube according to the invention is characterized by a connecting area that formed during the welding process comprised of melted and resolidified plastic material of the at least one plastic layer, which extends continuously in a radial direction from the outer circumferential surface to the inner circumferential surface of the tubular body of the packaging tube; expressed differently, the former two opposing edge faces are fixedly joined together by a connecting area that is continuous in a radial direction and partially consists of the edge face material. This configuration for the packaging tube is enabled by the method according to the invention, in which an outwardly opening (outer) longitudinal gap is filled with plastic material during the welding step, which preferably originates exclusively from the film substrate. In this way, plastic layer material can penetrate radially inward to a far greater extent than possible in prior art, which yields a very robust packaging tube that is also impervious to the passage of moisture and/or gas.

The radially innermost border of the first edge face is preferably placed under the thickness center of the second edge face, so as to obtain an outer longitudinal gap with the largest possible surface.

A further development of the invention advantageously provides that the circumferential extension of the connecting area, proceeding from a radially outermost area, i.e., from the outer circumferential surface in the welding area, taper inwardly in a radial direction until reaching a radial position lying radially further inward (relative to the aforementioned radially outermost area). In a first embodiment, this (inner) radial position can be a radially innermost position, specifically when the innermost longitudinal borders of the two edge faces are placed against each other. As alternative, however, the case can also involve a position spaced apart in a radial direction from the radially innermost position between the outer circumferential surface and inner circumferential surface, if the edge faces are displaced in terms of thickness, preferably in such a way that the second edge face projects over the inner circumferential surface to a certain extent in the circumferential direction prior to welding. It eminently makes sense for a sectional analysis to reveal that the connecting area exhibits a circumferential extension that increases from the radially inner radial position to the radially outermost area. The connecting area between the aforementioned radial position situated further inward preferably exhibits an essentially triangular contour up until the outer circumferential surface.

If an inner longitudinal gap is provided between the second edge face and inner circumferential surface, it is preferred that the circumferential extension of the connecting area also increase, particularly proceeding from the aforementioned position situated further inward up to the inner circumferential surface, wherein this inner connecting area preferably also has an essentially triangular contour viewed in cross section.

It is eminently preferred that a first (preferably not melted during welding, i.e., exhibiting its original shape) inner circumferential surface section of the tubular body be spaced apart in a radial direction from a second (preferably also not melted during welding, i.e., exhibiting its original shape) inner circumferential surface section, wherein the two aforementioned inner circumferential surface sections vertically displaced in a radial direction have formed between them an inner transitional section comprised of melted plastic layer material, with which a (preferably sloped) continuous transition in the circumferential direction is created between the inner circumferential surface sections. This (inner) transitional section is preferably generated by melting an inner projecting tip of a second edge face of the film substrate, which prior to welding projected over an inner circumferential surface edge section adjacent to the first edge face, with the formation of an inner longitudinal gap.

It makes sense especially that the film substrate being used consist of multiple layers, and encompass a barrier layer against moisture and/or oxygen that is preferably sandwiched between at least two (preferably weldable) plastic layers, and that a first barrier layer edge face (which is part of the first edge face) and a second barrier layer edge face (which is part of the second edge face) be completely covered in a radial direction by melted and resolidified plastic of the connecting area.

BRIEF DESCRIPTION OF THE DRAWINGS

Additional advantages, features and details of the invention may be gleaned from the following description of preferred exemplary embodiments, as well as based upon the drawings.

These drawings show:

FIG. 1 a schematic cross sectional view of a tubular body of a packaging tube with an exaggeratedly flatly depicted circumferential section, in which two longitudinal edge faces of the film substrate forming the tubular body are joined together through welding, FIG. 2a a section of a later (i.e., prior to welding) connecting area of a film substrate molded into a tubular body, wherein two beveled, vertically displaced edge faces of the film substrate abut against each other, and wherein a three-layer, symmetrical film substrate material is used in the exemplary embodiment shown, FIG. 2b a section of a bond between the film substrate and a tubular body manufactured through welding based on a situation according to FIG. 2a, FIG. 3a a situation during the formation of a tubular body out of a film substrate, in which the two edge faces of the film substrate are not vertically displaced in a radial direction, but rather situated in both a radially outer area and in a radially inner area on the same respective radius, FIG. 3b a section of a tubular body of a packaging tube manufactured based on the situation according to FIG. 3a, and FIG. 4 a depiction of an unspooled film substrate for more precisely explaining the location of the first and second angle.

DETAILED DESCRIPTION

On the figures, the same elements and elements with the same function are labeled with the same reference numbers.

FIG. 1 presents a cross sectional view of a tubular body 1 with an essentially circular contour for a known packaging tube essentially comprised of plastic and not shown in any more detail. The tubular body 1 consists of one single- or multi-layer film substrate 2, encompassing or consisting of at least one weldable plastic layer 3.

In order to manufacture the tubular body, the strip-shaped substrate 2 is molded into a cylindrical shape, wherein beveled edge faces not visible in detail on FIG. 1 are placed against each other, after which the film substrate is welded together to fix the tubular body 1 in the encircled area 4, wherein possible detailed views or embodiments of the area 4 (before and after welding) will be explained in greater detail in the following figures. For example, welding takes place so as to sandwich the area 4 between two sealing strips, which then are heated, in particular by means of an HF welding device, which leads at least to a partial melting of the film substrate in the area 4. The welding station is preferably followed by a known cooling section for the weld seam to form (i.e., harden).

Figure 2A:
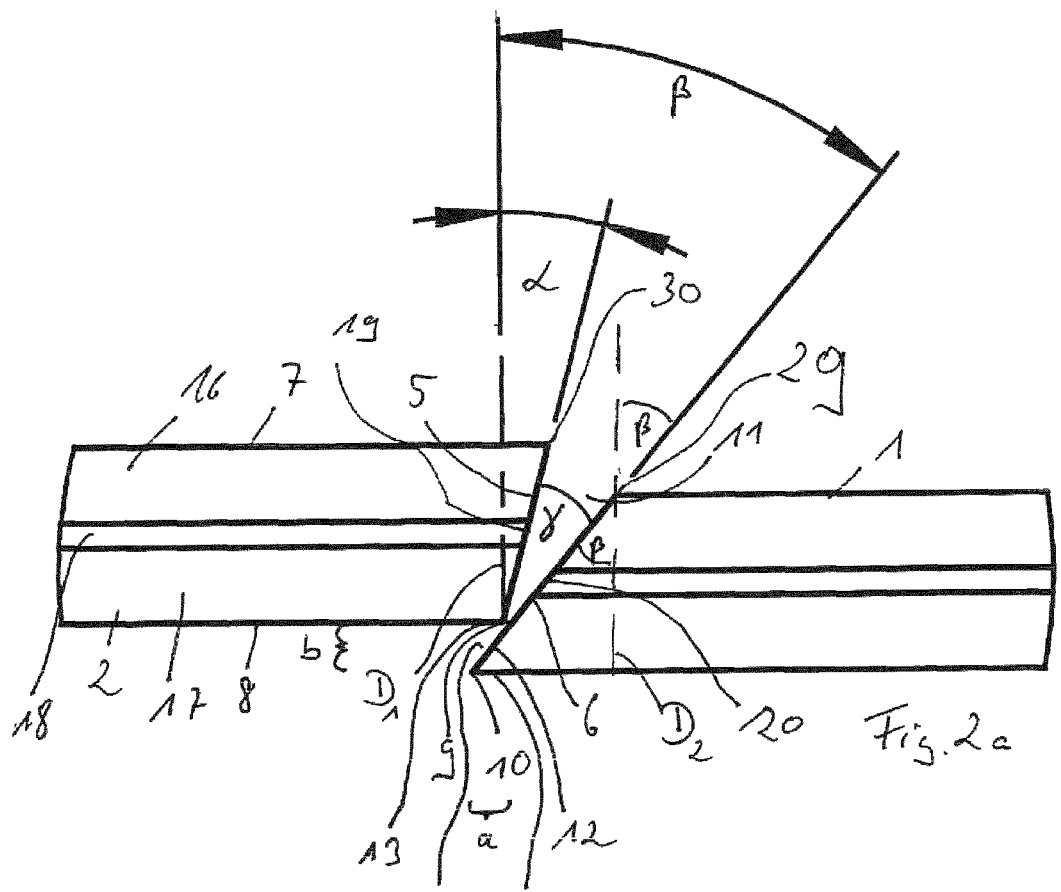

FIG. 2a depicts a possible situation prior to the welding step. The film substrate 2 has a three-layer configuration in the exemplary embodiment shown, and was shaped into a tubular body, for example by means of a molding strip and/or concave rollers, in such a way that a first edge face 5 of the film substrate 2 oriented in a circumferential direction abuts in sections, i.e., only partially or not completely, against an opposing second edge face 6 of the film substrate 2 oriented in a circumferential direction opposite the first circumferential direction.

As may be gleaned from FIG. 2a, both the first edge face 5 and second edge face 6 in the cross sectional view shown exhibit a straight contour, i.e., extend along a straight line from an outer circumferential surface 7 of the tubular body 1 up to the inner circumferential surface 8. The first edge face is here arranged at a first angle α relative to a thickness extension direction $D_1$ of the film substrate, wherein this angle α is smaller than a second angle β generated by the opposing, second edge face with a second thickness extension direction $D_2$ of the film substrate 2. The first thickness extension direction $D_1$ is situated at a (first) circumferential position of the tubular body, where a first radially innermost border 9 of the first edge face is located. The second thickness extension direction $D_2$ is situated at a second radially outermost border 29 of the second edge face displaced in a circumferential direction relative to the first radially innermost border 9, i.e., at a second circumferential position spaced apart from the first circumferential position. In the depiction, a possible (small) angle between the two thickness extension directions $D_1$ and $D_2$ is disregarded, i.e., it is assumed that the two thickness extension directions (thickness extension lines) run parallel.

In the exemplary embodiment according to FIG. 2a, the edge faces 5, 6 are vertically displaced in a radial direction, in such a way that the thickness centers of the edge faces 5, 6 not separately depicted are spaced apart in a radial direction, so that the thickness center of the first edge face 5 lies radially further to the outside than the thickness center of the second edge face 6. This is achieved by virtue of the fact that the first radially innermost border 9 of the first edge face, i.e., the circumferential position, at which the edge face 5 hits the inner circumferential surface 8 (likewise the first thickness extension line $D_1$), is arranged radially further to the outside than a second radially innermost border 10 of the second edge face 6. As a result, the second radially outermost border is displaced radially further in the direction of the midpoint of the tubular body than a first radially outermost border 30.

As evident from FIG. 2a, the first edge face 5 and second edge face 6 radially outside the first innermost border 9 delimit an outwardly open longitudinal gap 11, whose extension in the circumferential direction rises as the distance to the cross sectional tubular body midpoint increases (i.e., viewed in a radial direction toward the outside). The two edge faces 5, 6 include an opening angle γ. In the exemplary embodiment shown, the first angle α=15°, the second angle β=30°, and the opening angle γ=15°. The opening angle corresponds to the angular difference between the second angle β and first angle α, wherein this angular difference measures between 3° and 7° in an especially preferred embodiment (not shown).

In the exemplary embodiment depicted, the radially innermost border 9 of the first edge face 5 abuts against the second edge face 6 under the thickness center of the second edge face 6 viewed in a radial direction, which is generally preferred.

As mentioned, the thickness centers of edge faces 5, 6 are not situated on the same radius. As a result, the second edge face 6 with a radially inner area 12 projects over the inner circumferential surface 8 of the tubular body 1 in a second circumferential direction, here toward the left in the drawing plane, specifically by a distance a measured in the circumferential direction for the shown exemplary embodiment of mm. Expressed differently, a radially inner tip whose radially inner apex is formed by the innermost border 10 projects over the inner circumferential surface 8, more precisely a first inner circumferential edge section 13 adjoining the first edge face 5 toward the left in the drawing plane, i.e., in a second circumferential direction. This yields an inner longitudinal gap 14 with an essentially triangular cross sectional contour between the second edge face 6 and inner circumferential surface edge section 13.

In addition to the inner longitudinal gap 14, the thickness center displacement of the edge faces results in the first inner circumferential surface edge section 13 that borders the first edge face 5 becoming situated radially further to the outside by a dimension b of 130 mm than a second circumferential surface edge section 15 that borders the second edge face 6. Dimension b here corresponds to the thickness center displacement of the edge faces.

In the welding process that follows the positioning step, the two longitudinal gaps 11, 14 are sealed or at least partially filled by plastic material of the film substrate 2, preferably in such a way that, as will be explained later based on FIG. 2b, melted and resolidified plastic material continuously runs in a radial direction from the outer circumferential tubular body up to the inner circumference.

In the exemplary embodiment shown, the film substrate is symmetrically designed (although this does not absolutely have to be the case). As mentioned, it involves a three-layer film, which in addition to an outer, here outermost, weldable plastic layer 16, exhibits an inner, here innermost, weldable plastic layer 17, wherein the two plastic layers 16, 17 in the exemplary embodiment shown exhibit the same thickness (which does not absolutely have to be the case) and have a barrier layer 18, for example an aluminum layer, sandwiched between them.

As may further be gleaned from FIG. 2*a*, a first barrier layer edge face 19 and second barrier layer edge face 20 are spaced apart from each other in a radial direction, wherein even alternative embodiments make it possible to realize a partial overlap in a radial direction or a complete overlap; the latter variant involves arranging the edge faces 5, 6 in such a way that the first radially innermost border 9 (at least approximately) borders the second radially innermost border 10 or abuts against the latter. The barrier layer edge faces 19, 20 comprise part of the respective edge face 5, 6, and thus run at a first $\alpha$ or second $\beta$ angle relative to the respective thickness extension direction $D_1$ or $D_2$.

Figure 2B:
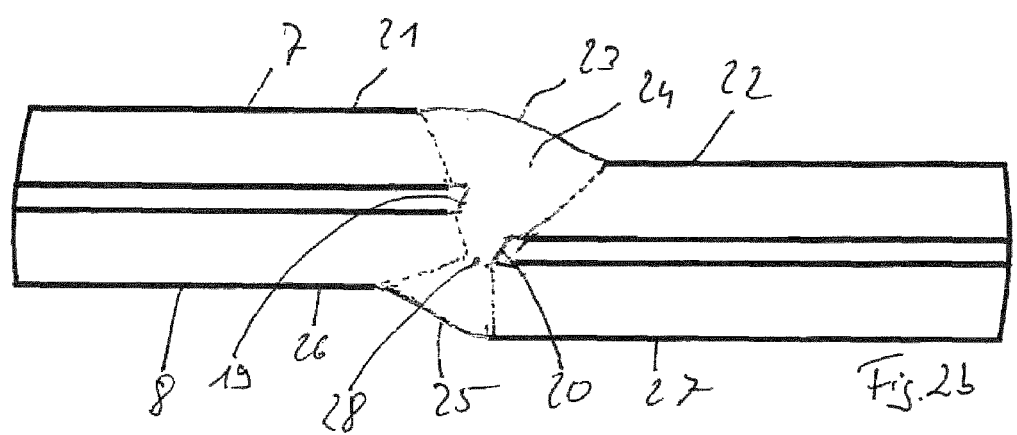

FIG. 2*b* shows a section of a finished, i.e., welded tubular body 1. The depiction reveals a central vertical displacement (radial displacement) between a first outer circumferential section 21 (not deformed during welding) and a second outer circumferential surface section 22 spaced apart in the circumferential direction. The two outer circumferential surface sections 21, 22 lying on different radii are joined together by an outer transitional section 23, which arises during welding in the situation depicted on FIG. 2*a*. This outer transitional section 23 seamlessly, i.e., smoothly, joins together the two radially displaced outer circumferential surface sections 21, 22, and forms the outer circumferential surface or an outer circumferential surface section of a connecting area 24 comprised of material of the film substrate 2 melted and resolidified during the welding process, in the exemplary embodiment shown the two plastic layers 16, 17.

In the area of its inner circumference, an inner transitional section 25 is formed between a first and a second (like the outer circumferential sections not deformed during welding) inner circumferential surface section 26, 27, which are spaced apart in a radial direction by the central displacement.

As evident from FIG. 2*b*, the connecting area 24 comprised of plastic layer material melted and again resolidified during welding extends in a radial direction away from the outer circumferential surface 7, more precisely away from the outer transitional section 23, up to the inner circumferential surface 8, even more precisely up to the inner transitional section 25, and in so doing completely covers the two barrier layer edge faces 19, 20 in a radial direction. Also evident is that the circumferential extension of the connecting area tapers proceeding from an outermost area formed by the transitional section 23 in a radial direction up to a radial position 28 lying radially further toward the inside. Expressed differently, the circumferential extension of the connecting area 24 continues to increase radially outward proceeding from the radial position 28 lying on the inside, which is localized roughly in the area where the first edge face 5 abuts against the second edge face 6 (see FIG. 2*a*) prior to welding, and also radially inward proceeding from the (inner) position 28. The shaping or contour of the connecting area section located radially outside the inner position 28 is essentially determined by the shape and size of the outer longitudinal gap prior to welding, and by the connecting area section of the inner longitudinal gap 14 that radially inwardly adjoins the position 28, and was essentially filled with material of the tip projecting over the inner circumferential surface during welding.

Reference is made to FIG. 4 to illustrate the position of the first and second angle $\alpha, \beta$ with the film substrate unspooled.

The figure presents a general view of an unspooled, laterally cut film substrate 2, wherein the latter can involve a single-layer, multi-layer, symmetrical or asymmetrical film material. Indication is made of the two thickness extension directions $D_1$ and $D_2$, which are situated parallel with the film substrate unspooled. Visible are the two edge faces 5, 6, which run at different angles $\alpha, \beta$ to the respective thickness extension line $D_1, D_2$. As evident from FIG. 4, the first edge face 5 with the later inner circumferential surface 8 forms an angle of $90°+\alpha$ in the unspooled state, and the second edge face 6 forms an angle differing from the latter of $90°+\beta$ relative to the outer circumferential surface parallel to the inner circumferential surface 8. The different angles $\alpha, \beta$ can be generally obtained by cutting the film substrate using two blades (knives) varyingly beveled in relation to the surface extension film substrate, wherein this cutting step, for example, is realized inline prior to the positioning step for molding the film substrate into the tubular form, or outside of the device in an upstream procedural step.

Another exemplary embodiment will be explained below based on FIG. 3*a*, wherein the focus will essentially be placed only on differences from the exemplary embodiment according to FIGS. 2*a* and 2*b* to avoid repetition. Reference is made to the preceding exemplary embodiments with regard to the similarities.

Figure 3A:
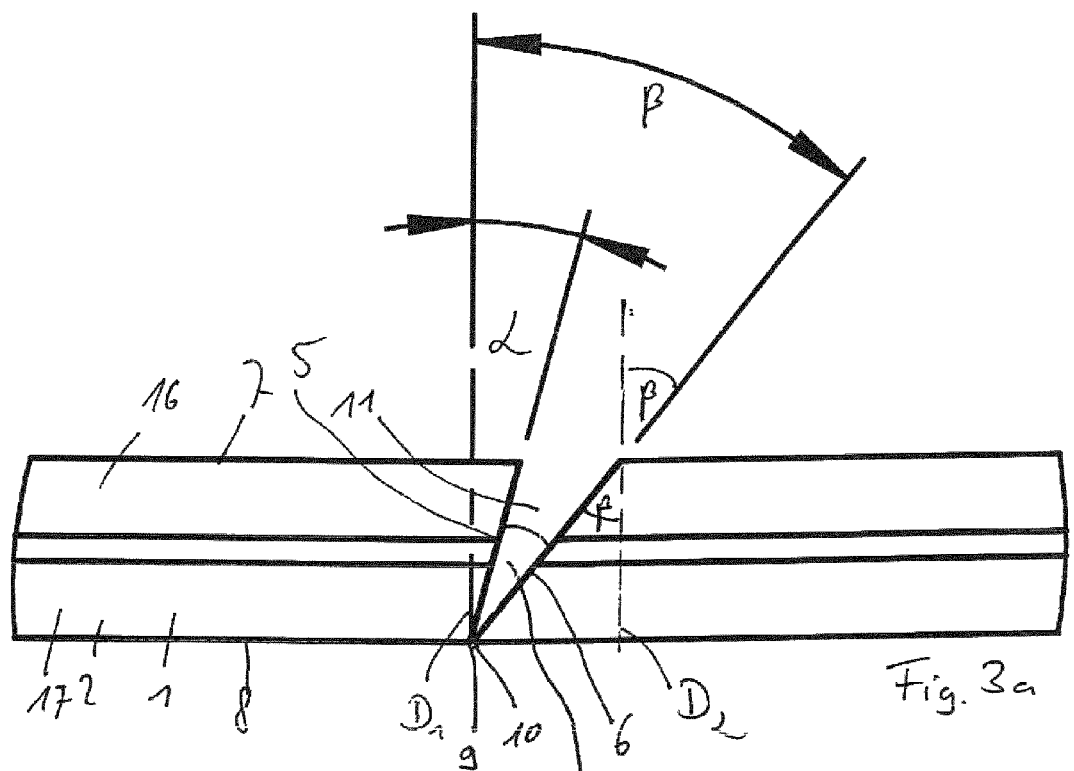
Figure 3B:
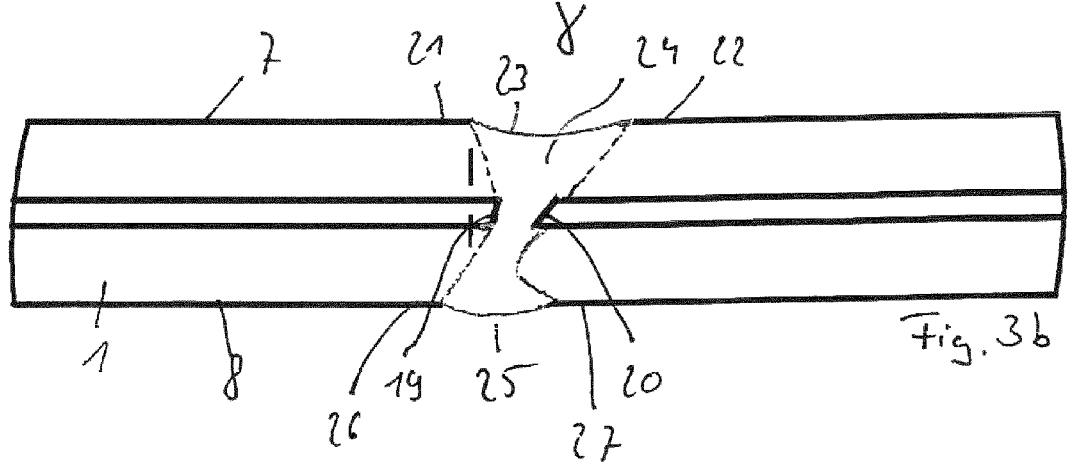

As opposed to the above exemplary embodiment, no radial displacement (vertical displacement) is realized in the exemplary embodiment according to FIGS. 3*a* and 3*b*; this is achieved by arranging the two radially inner borders 9, 10 on the same radius.

This eliminates the overlap of the inner circumference in the circumferential direction, i.e., there essentially exists no inner longitudinal gap, but rather exclusively an outer longitudinal gap 11 open to the outside, which extends from the outer circumferential surface to the inner circumferential surface of the tubular body 1.

In the exemplary embodiment shown, the first edge face 5 bordering the outer longitudinal gap 11 from the left in the drawing plane forms an angle $\alpha$ of 15° with the first thickness extension direction $D_1$. The second edge face 6 forms an angle $\beta$ of 30° with the second thickness extension direction $D_2$. Therefore, the angular distance measures 15°. This results in the outer longitudinal gap 11 with an opening angle $\gamma$ of 15°.

The depicted multi-layer film can be replaced by a single-layer film, which in this case consists entirely of weldable plastic material.

During welding, the outer longitudinal gap 11 is filled with plastic layer material of the at least one plastic layer, here both plastic layers 16, 17, with the formation of the connecting area 24, which extends from the outer circumferential surface 7 up to the inner circumferential surface 8. The connecting area 24 covers both barrier layer edge faces 19, 20 in a radial direction.

The outer transitional section 23 between the outer circumferential surface sections 21, 22 that results during welding is slightly concavely curved radially inward, while the radially inner transitional section 25 yields a more convex curvature, which joins together the two inner circumferential surface sections 26, 27 located on a shared radius.

The invention claimed is:
1. A method for manufacturing a tubular body for forming packaging tubes, comprising:
providing a strip-shaped film substrate having first and second edge faces extending in a longitudinal direction of the film substrate, wherein the film substrate com- prises at least one weldable plastic layer or consists of at least one weldable plastic layer, wherein the first and second edge faces are spaced apart by a width of the film substrate, wherein the first edge face runs at a first angle (α) relative to a thickness extension direction of the film substrate, and the second edge face runs at a second angle (β) relative to the thickness extension direction of the film substrate, wherein the first angle (α) and second angle (β) differ in size, the first angle (α) being smaller than the second angle (β) by an angular difference of between 3° and 70°, bending the film substrate to form the film substrate into a tubular shape having an inner circumferential surface and an outer circumferential surface and to place the first and second edge faces opposite each other in a welding position in such a way that an outwardly open longitudinal gap is delimited by the first and second edge faces, and exposing the first and second edge faces in the welding position to heat to weld them together and form the tubular body.

2. The method according to claim 1, wherein the first angle (α) lies within an angular range of between 1° and 77°, and/or the second angle (β) lies within an angular range of between 4° and 80°.

3. The method according to claim 2, wherein the first angle (α) lies within an angular range of between 5° and 70°.

4. The method according to claim 2, wherein the first angle (α) lies within an angular range of between 10° and 60°.

5. The method according to claim 2, wherein the second angle (β) lies within an angular range of between 5° and 70°.

6. The method according to claim 2, wherein the second angle (β) lies within an angular range of between 10° and 60°.

7. The method according to claim 1, wherein the first angle (α) is smaller than the second angle (β) by an angular difference within an angular range of between 3° and 30°.

8. The method according to claim 7, wherein the angular difference is within an angular range of 3° and 7°.

9. The method according to claim 1, wherein the outwardly open longitudinal gap is filled at least partially with plastic material of the at least one plastic layer during welding.

10. The method according to claim 1, wherein a first thickness center of the first edge face is displaced in a radial direction relative to a second thickness center of the second edge face when the first and second edge faces are placed opposite each other in the welding position, in such a way that the first thickness center is situated radially further to the outside than the second thickness center by a distance ranging between 10 μm and 300 μm.

11. The method according to claim 10, wherein the distance is between 20 μm and 250 μm.

12. The method according to claim 1, wherein the first and second edge faces are situated relative to each other in such a way that the second edge face projects over the inner circumferential surface by a distance measured in the circumferential direction ranging between 0.01 mm and 1.50 mm, so that an inner longitudinal gap is formed between the second edge face and the inner circumferential surface.

13. The method according to claim 12, wherein the distance is between 0.05 mm and 1.0 mm.

14. The method according to claim 12, wherein the inner longitudinal gap is filled during welding at least partially with plastic material of a portion or tip of the film substrate that projects over the inner circumferential surface.

* * * * *